United States Patent [19]

Osborne et al.

[11] 4,270,393
[45] Jun. 2, 1981

[54] ISOLATION SYSTEM

[75] Inventors: Norman A. Osborne, Englewood; Robert L. Gates, Littleton, both of Colo.

[73] Assignee: Martin Marietta Corporation, Bethesda, Md.

[21] Appl. No.: 19,680

[22] Filed: Mar. 12, 1979

[51] Int. Cl.$^3$ ............................................. G01C 19/16
[52] U.S. Cl. ........................................ 74/5 F; 74/5.5; 248/179; 248/583
[58] Field of Search .............. 248/561, 581, 583, 575, 248/605, 179, 182; 74/5 F, 5.5, 5 R; 64/18

[56] References Cited

U.S. PATENT DOCUMENTS

| | | | |
|---|---|---|---|
| 2,246,738 | 6/1941 | Lauck | 74/5 R X |
| 2,797,580 | 7/1957 | Taylor | 74/5 F |
| 2,944,426 | 7/1960 | Amara | 74/5 R X |
| 2,945,414 | 7/1960 | Blackstone | 248/182 X |
| 2,950,079 | 8/1960 | Horsfall | 248/179 |
| 2,971,383 | 2/1961 | Thrasher | 74/5 R |
| 3,002,392 | 10/1961 | Scotto | 74/5 F |
| 3,028,592 | 4/1962 | Parr et al. | 74/5 R X |
| 3,266,325 | 8/1966 | Schaffer | 74/5 R X |
| 3,550,395 | 12/1970 | Herzog et al. | 74/5 F |
| 3,765,631 | 10/1973 | Herbst et al. | 248/583 |

FOREIGN PATENT DOCUMENTS

| | | | |
|---|---|---|---|
| 1272697 | 8/1961 | France | 74/5 R |
| 1425837 | 12/1965 | France | 74/5 R |

Primary Examiner—Rodney H. Bonck
Attorney, Agent, or Firm—Ronald G. Ort; Phillip L. DeArment; Gay Chin

[57] ABSTRACT

A vibration-isolating apparatus having orthogonal X, Y, and Z axes is provided for mounting a payload to a base. The payload contains a torque producing device. Torque generated about the X-axis in the payload is communicated to the base through a stiff linkage in the rotational degree of freedom about the X-axis. The apparatus includes first and second support frames, the payload mounted on the first support frame and the second support frame mounted to the base. Gimbal means permit rotation of the payload about the Y and Z axes. Linear dampening means dampen forces between the payload and base communicated linearly along the X, Y and Z axes and rotation dampening means dampen forces between the payload and base communicated rotationally about the Y and Z axes.

5 Claims, 5 Drawing Figures

ISOLATION SYSTEM

BACKGROUND OF THE INVENTION

This invention relates to vibration isolation systems, and more particularly to a system which isolates a payload from a base along specific degrees of freedom while permitting stiff torque transmission between the payload and the base.

A wide variety of torque-producing devices make use of spinning rotor elements mounted on low-friction bearings. Among such devices are gyroscopes and stabilizing reaction wheels which have many applications in the aerospace industry. Such torque-producing devices, which will hereafter be simply referred to as "payloads," are generally mounted on a support structure which will hereinafter be simply referred to as a "base".

It has been found that for many applications it is necessary to isolate the payload from the vibrations and other extraneous motions of the base on which it is mounted, and in like manner isolate the base from the payload. On the other hand, to be functional it is necessary that the torque produced by the payload be transmitted to the base, preferably with a minimum of compliance and a maximum of stiffness.

One method of providing vibration isolation between the payload and base is simply to mount the payload on springs which can absorb the vibrational forces and prevent their transmission. However, if such spring systems also absorb the torque produced by the spinning rotor element of the payload, then they are preventing the payload from functioning with respect to the base.

SUMMARY OF THE INVENTION

It is therefore an object of the present invention to provide a system for isolating a torque-producing payload and a support base in a manner which permits transmission of the generated torque from the payload to the base while absorbing linear vibration or other undesired forces generated in either the payload or the base.

A further object is to provide such a system which also includes means for mounting the payload on gimbals to permit angular movement of the payload with respect to the base.

A still further object is to provide such a gimbaled mounting means in which the gimbals are provided with electric motors such that the gimbal rotation and linear motion can be controlled.

In accordance with the present invention, a payload support system is provided comprising two concentric gimbal rings, one of which is positioned inside the other. The system will be described in relation to arbitrary X, Y and Z axes which are all at right angles to each other and intersect at the common center of the two gimbal rings. The inner gimbal ring is attached to the outer gimal rings by pivots which permit it to rotate about an axis which passes through the center of the two gimbal rings, which will be designated as the X axis. The means by which the inner gimbal ring is attached to the outer gimbal ring also includes flexural means which permit lateral displacement along the X axis. This X axis is at right angles to the axis of rotation of the torque-producing device in the payload, such axis being designated the Z axis for this discussion.

One of the gimbals is further mounted to either the payload or the base by pivots which permit rotation about the Y axis and by flexural means which permit lateral movement along the Y axis. In addition, the other gimbal may be mounted to the other of the payload or base by flexural means which permit lateral movement along the Z axis. Thus linear vibration or other undesired forces generated in either the payload or the base can be absorbed by the isolation system in the three lateral degrees of freedom along the X, Y and Z axes as well as in the angular or torque degrees of freedom about the X and Y axes. This is accomplished while still maintaining a stiff connection between the payload and base in the angular direction about the Z axis, thus permitting communication of the payload torque to the base.

DESCRIPTION OF THE DRAWINGS

The foregoing as well as additional objects and advantages of the present invention will be apparent from the following detailed description of preferred embodiments thereof and the accompanying drawings in which.

DESCRIPTION OF THE PREFERRED EMBODIMENTS

Figure 1:
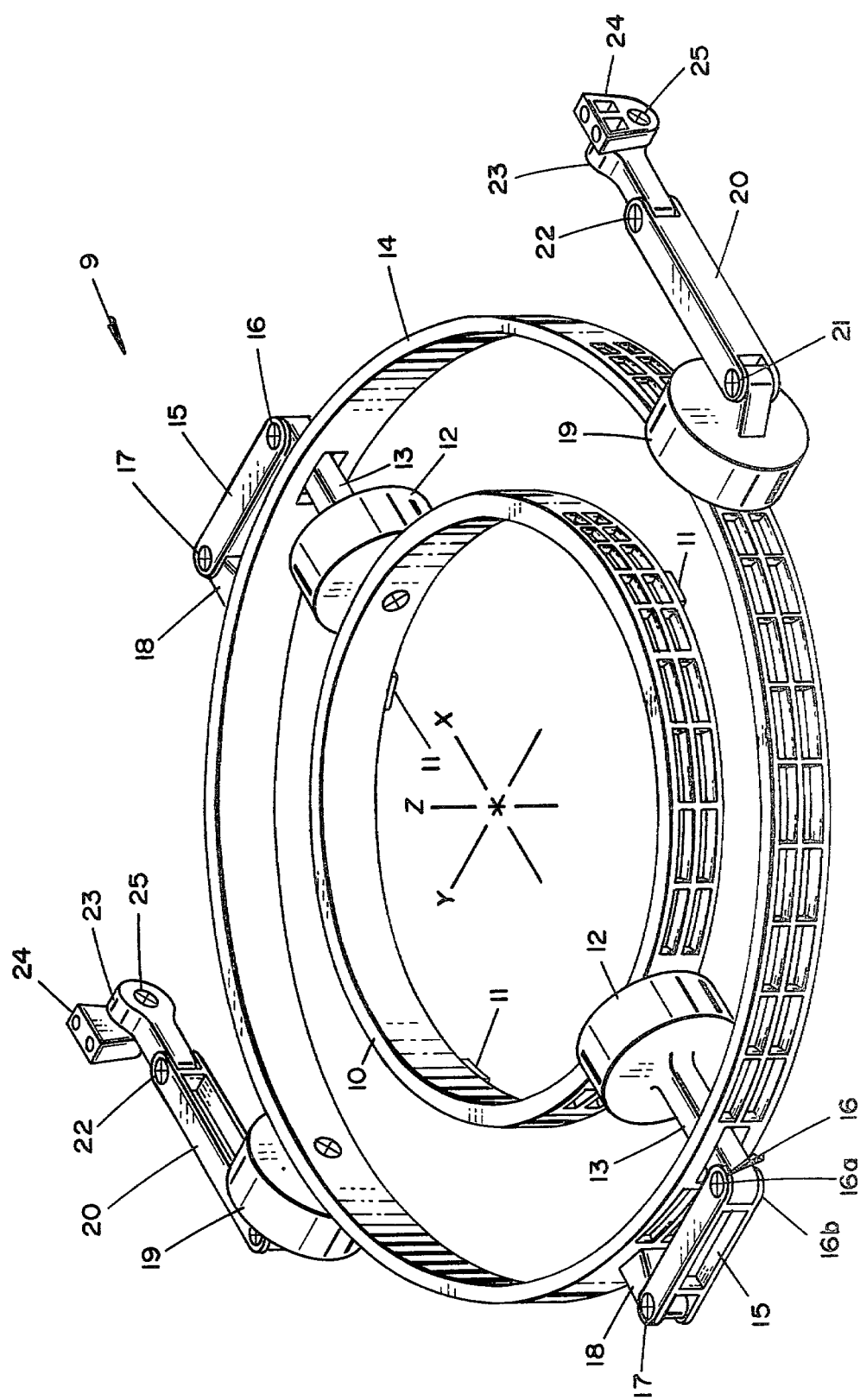
FIG. 1 is a perspective view of one embodiment of the present invention.

FIG. 1 is a perspective view of one embodiment of the present invention designated in the entirety as apparatus 9. In this embodiment inner gimbal ring 10 is attached to a base (not shown) by three fixed base attachments 11. Inner gimbal ring 10 is attached to inner gimbal pivots 12 which in turn are mounted on connecting arms 13. Connecting arms 13 pass through outer gimbal ring 14 and are attached to linkages 15 by spring biased flex hinges 16. Preferably these flex hinges, and all of the other flex hinges comprise separate upper and lower flex hinges, indicated as 16a and 16b on the top and bottom of linkage 15, rather than single hinges passing through the linkage 15, because separate hinges seem to make stronger connections. Linkages 15 are attached by flex hinges 17 to connectors 18 which are affixed to the outside of outer gimbal ring 14. Outer gimbal ring 14 is suspended by two outer gimbal pivots 19, which are in turn attached to linkages 20 by means of flex hinges 21. Another set of flex hinges 22 then joins linkages 20 to pivot arms 23 which are connected to payload attachments 24 by means of spring-biased flexural pivots 25. The payload attachments are then affixed to the desired payload (not shown) by any suitable means.

A set of mutually perpendicular X, Y and Z axes which intersect at the common center of the two gimbal rings are shown for reference.

As previously discussed, the payload, which in this case is to the outer gimbal ring, includes a torque-producing device such as a gyroscope. This torque-producing device spins about an axis to generate its useful torque. In the embodiment of this invention shown in FIG. 1, the torque-producing axis has been arbitrarily designated as the Z axis. Reference to the rotation of the payload about the X or Y axis refers only to the rotation of the entire payload in gross for purposes of orientation. This is in contrast to its functional torque-producing spin which is only about the Z axis.

The apparatus as shown provides for rotation about the X and Y axes by the payload by means of inner gimbal pivots 12 and outer gimbal pivots 19. As desired for a particular application, these gimbal pivots may take a variety of forms. For example, they may be simple unbiased bearings in which case the gimbal rings will remain in whatever positions they are placed by the external forces acting upon them. Alternatively these pivots could be spring biased to urge the gimbal rings to return to the X—Y plane, such spring-biased pivots being well known in the art. Both of these types of pivots are merely mechanical, without any means of actively pointing the payload at any particular target. Therefore these may be considered passive gimbal pivots.

Two other types of gimbal pivots which could be used would include electric motors, wherein the gimbals are pivoted in resonse to electric current supplied to the motors by control means. In one configuration the motors can be torque motors, with means to sense an external torque acting on the gimbal ring to pivot the ring on their axis and to then activate the motors to exert a counteracting force to maintain the gimbal ring in the X—Y plane. These would be considered only partly active gimbal pivots, because although electrically controlled, these pivots still cannot actively point the payload. Alternatively, the gimbal pivots can be fully active if electric motors are provided with means to not only compensate for external torques on the rings but also with means to rotate the rings to a predetermined position and to maintain the rings in that position. If such fully active pivots are used, then the gimbal pivots become part of an active pointing system to aim the payload in a desired direction.

The linkages 15 with associated flex hinges 16 and 17 permit lateral movement of the payload with respect to the base along the X axis while linkages 20, with associated flex hinge 21 and 22 permit lateral movement along the Y axis. As previously discussed, preferably each flex hinge actually represents a pair of separate upper and lower flex hinges to maximize the stiffness of the hinged joint in any non-flexural direction. Alternatively these flex hinges could be replaced by electric motors, as previously discussed for the gimbal pivots, to provide partly or fully active control of the lateral movement of the payload along the X and Y axes.

In this embodiment of the present invention, no provision is made to permit rotation about the Z axis, and therefore the connection between the base and the payload is relatively stiff in regard to such rotation. Lateral displacement along the Z axis is permitted by flexural pivots 25, which may either be simple spring biased hinges, or electric motors if partly or fully active control of lateral movement along the Z axis is desired.

In this embodiment, the inner gimbal ring is designated as being attached to the base, with the outer ring attached to the payload. However, the operation of the system would still be the same if the payload were attached to the inner ring and the base to the outer. In fact, there is really no need to even designate one body as the base and another as the payload, since apparatus 9 could be used to connect two bodies which could even be identical.

Figure 2:
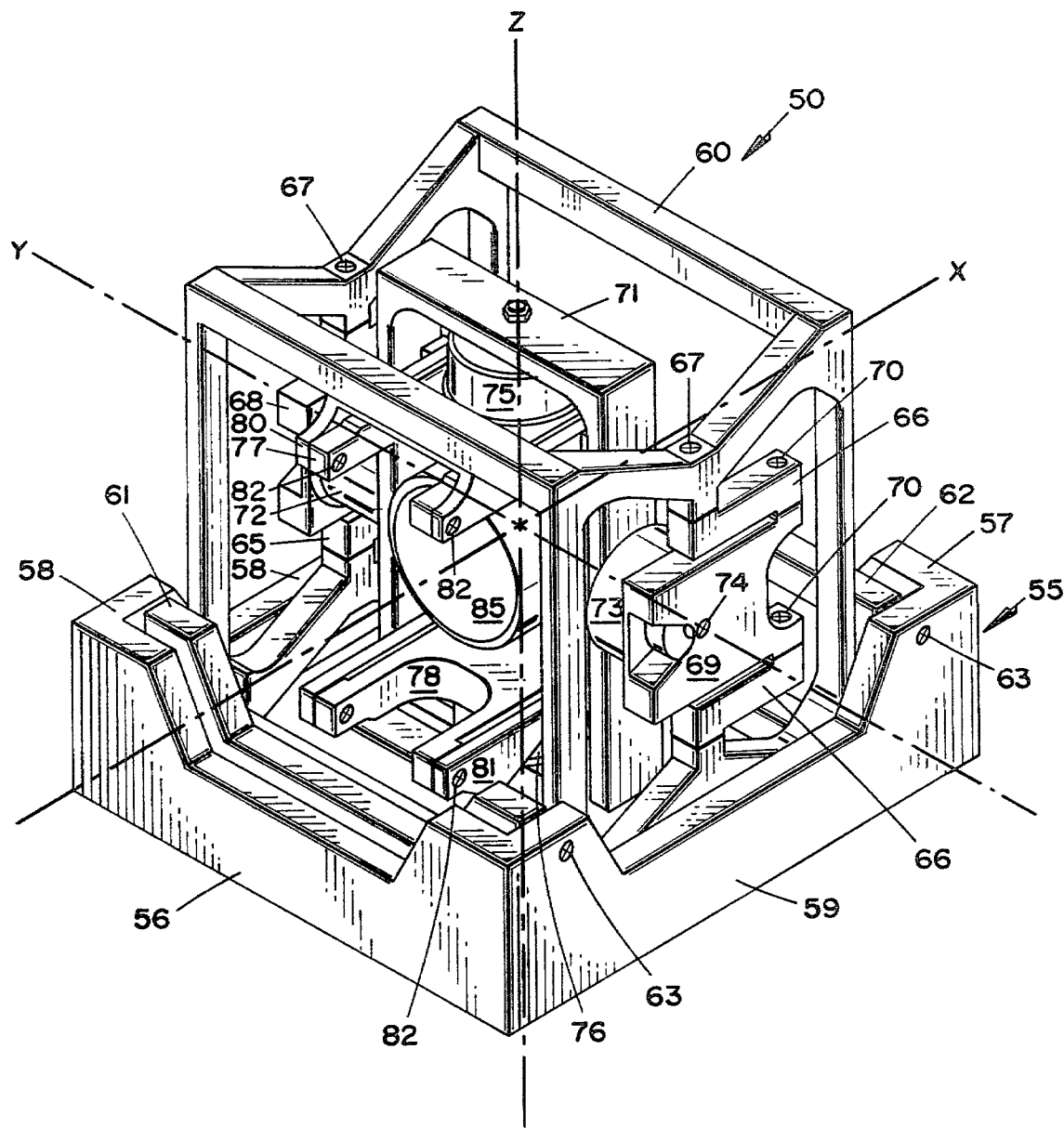
FIG. 2 is a perspective view of another embodiment of the present invention.
Figure 3:
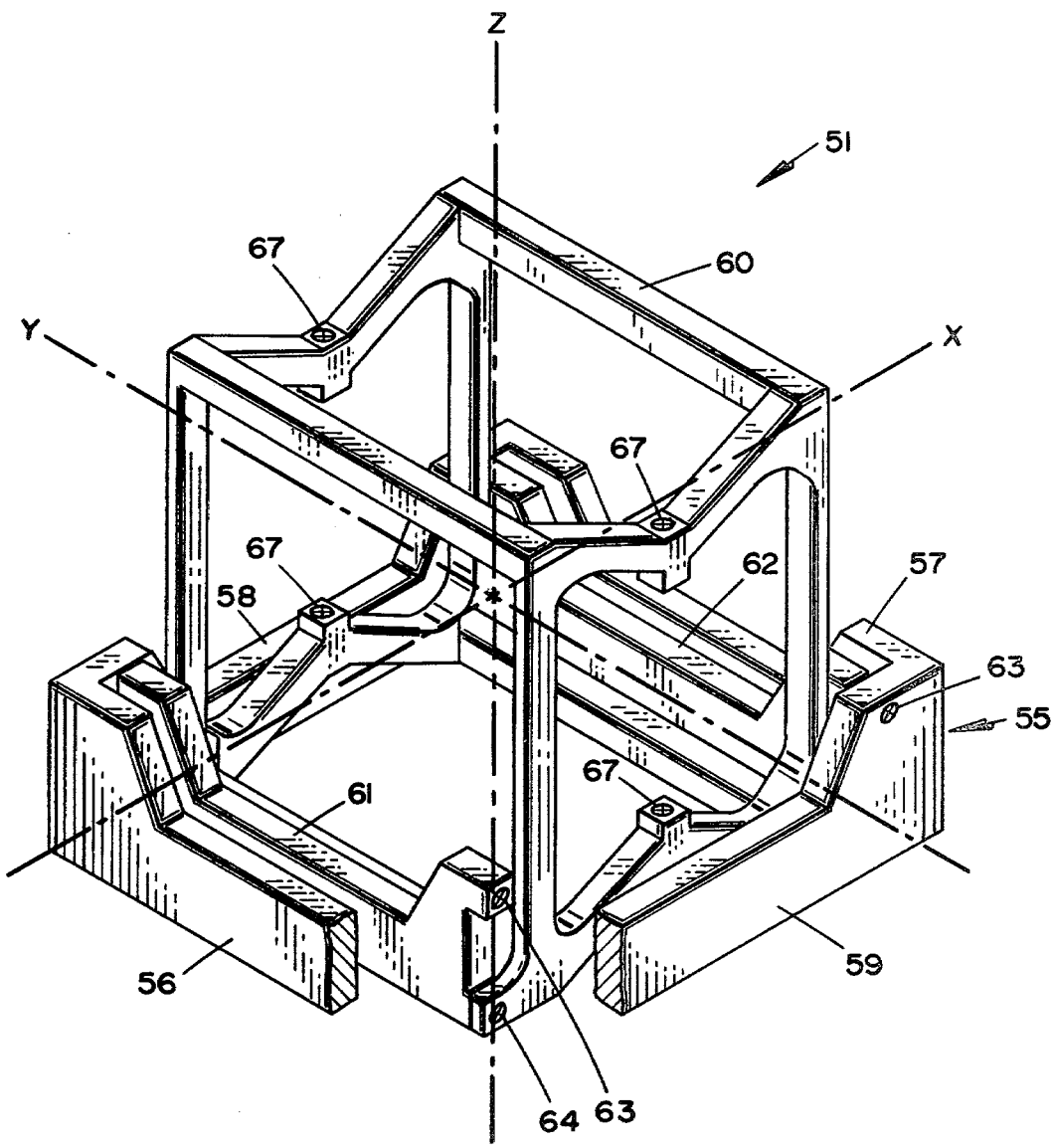
FIGS. 3, 4 and 5 are perspective view of components of the embodiment shown in FIG. 2, in the same perspective and scale as FIG. 2.
Figure 4:
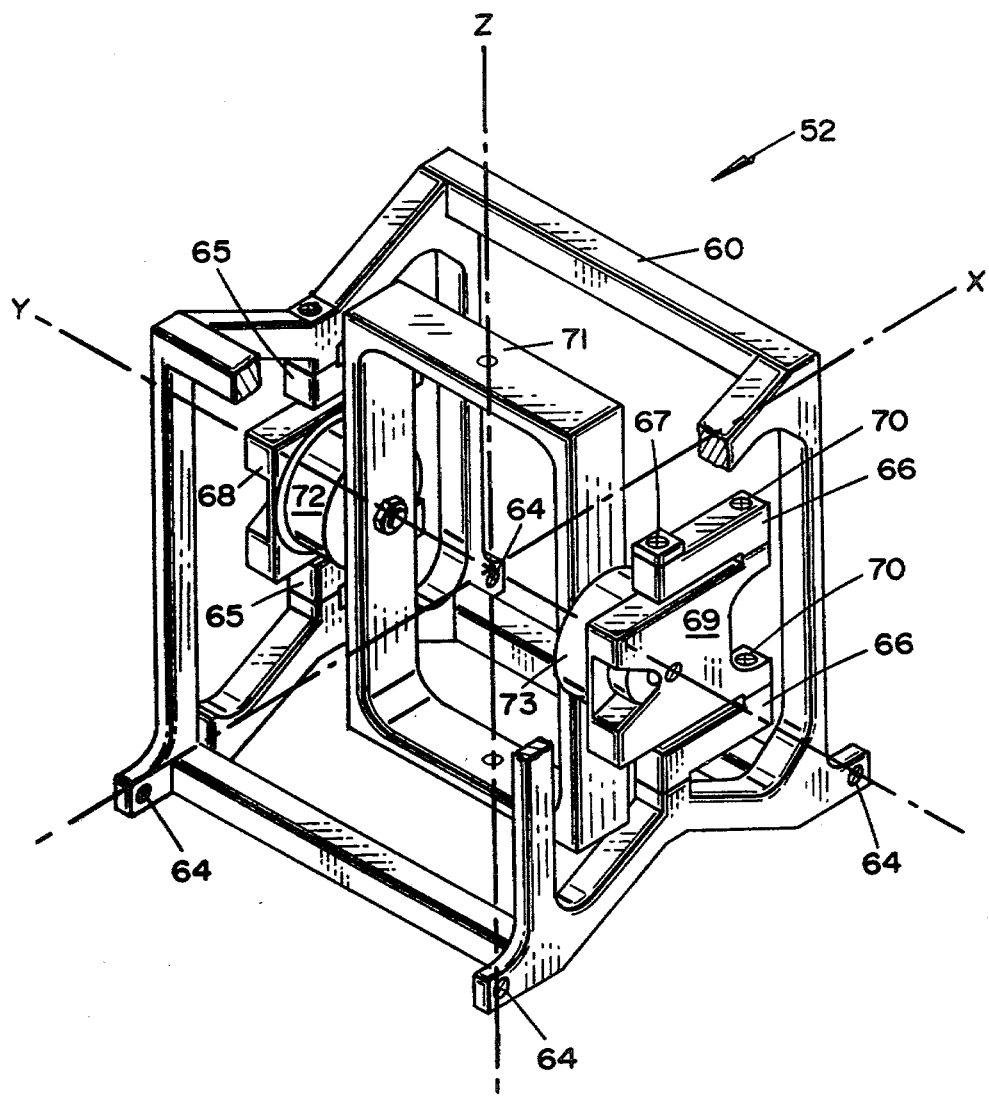
Figure 5:
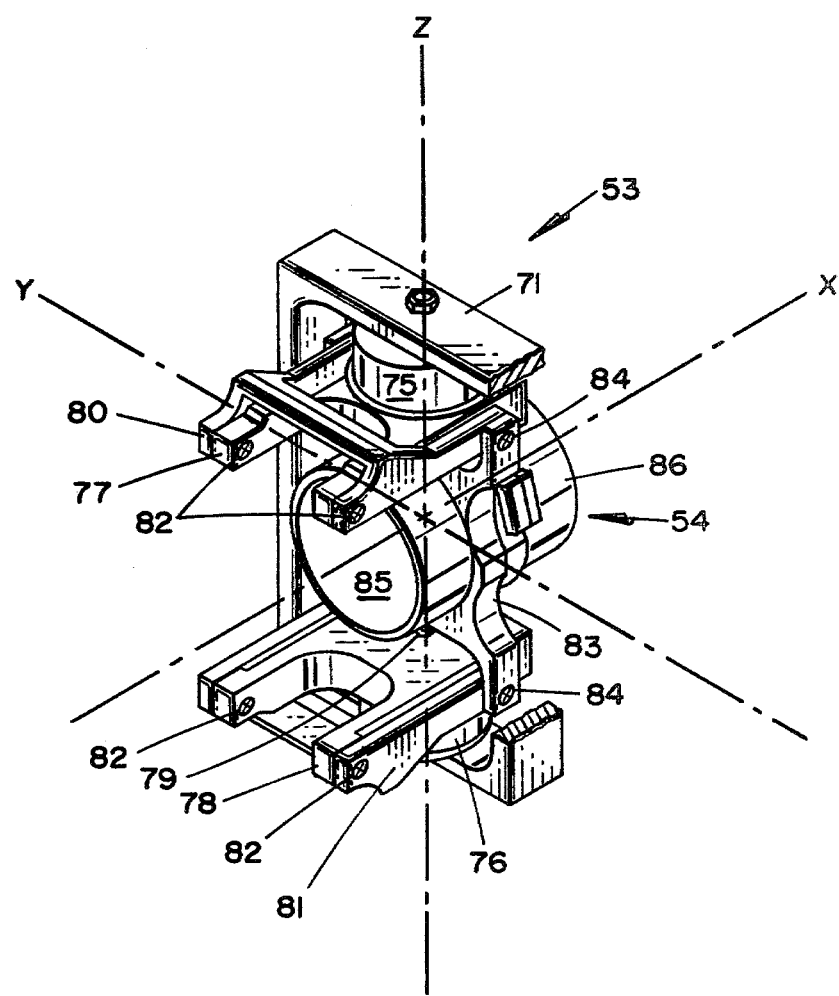

FIG. 2 shows another embodiment of the present invention generally identified as apparatus 50. Although cubic in form, this apparatus is very similar in function to the two-ring apparatus 9 previously described. To assist in understanding the structure of apparatus 50, FIGS. 3, 4, and 5 are included which respectively show the outer structure 51 intermediate structure 52 and inner structure 53 of apparatus 50, as well as a sample payload 54 mounted on the inner structure, FIGS. 2 to 5 are all drawn to the same scale and perspective, and the same components will be given the same reference numbers when they appear in more than one figure. In addition, X, Y and Z axes have been indicated to aid in the explanation of this apparatus.

It should be noted that in the apparatus shown in FIGS. 2 to 5, the axes have been selected such that the axis of spin of the torque-producing device of the payload is the X axis rather than the Z axis as in the first embodiment of this apparatus shown in FIG. 1. Therefore the X axis of the FIG. 2 embodiment should be considered as corresponding to the Z axis of the FIG. 1 embodiment. Likewise, the Y and Z axes of the FIG. 2 embodiment correspond to the X and Y axes of the FIG. 1 embodiment.

Referring to FIGS. 2 and 3, apparatus 50 is mounted on a base frame 55, which comprises a base front 56, base back 57, and base sides 58 and 59. Outer gimbal 60 is mounted to base frame 55 by means of two outer transition arms 61 and 62. These transition arms are connected to the base sides 58 and 59 by four pivots 63, the two pivots 63 connected to side 58 not being visible in the drawings. These, and all of the pivots in this apparatus are preferably commercially available spring-biased flex pivots, but as discussed in regard to apparatus 9, they could be replaced with motorized pivots for controlled movement of the gimbals. Transition arms 61 and 62 are then connected to outer gimbal 60 by four pivots 64, which can all be seen in FIG. 4.

Comparing the present apparatus 50 to the previously discussed double ring apparatus 9, transition arms 61 and 62 would correspond to the two linkages 20, with pivots 63 and 64 corresponding to flex hinges 22 and 21 respectively. In this case pivot-mounted transition arms 61 and 62 permit longitudinal movement of outer gimbal 60 along the X axis.

A pair of intermediate transition arms 65 and 66 are mounted to outer gimbal 60 by four pivots 67. Transition arm 65 and transition arm 66 are each unitary structures with the two visible portions of each arm being connected. Mounted to transition arms 65 and 66 are motor mounts 68 and 69 respectively, by four pivots 70, the two correcting transition arm 65 and motor mount 68 not being visible in the drawings. Inner gimbal 71 is pivotably connected to motor mounts 68 and 69 by torque motors 72 and 73. These torque motors are connected to their respective motor mounts by pivots 74. These motors cause rotation of the inner gimbal 71 about the Y axis, and may hereinafter be referred to as the Y-axis motors. Intermediate transition arms 65 and 66, with their associated pivots, permit lateral movement of inner gimbal 71 along the Y axis.

Referring now to FIG. 5, a pair of torque motors 75 and 76 are attached to the inside of inner gimbal 71 concentric with the Z axis. These motors control rotation of the payload about the Z axis and will therefore be referred to as the Z-axis motors. They are attached to motor mounts 77 and 78 by pivots 79, only one of which is visible. Motor mounts 77 and 78 are in turn attached to inner transition arms 80 and 81 by pivots 82. Inner transition arms 77 and 78 are in turn attached to payload frame 83 by means of pivots 84. Inner transition arms 77 and 78, with their associated pivots, permit the payload 54 to move vertically along the Z axis. These means are provided in apparatus 50 for flexible support for payload 54 laterally in the X, Y, and Z axes. In addition means are provided to provide motor-controlled angular flexibility about the Y and Z axes. Thus, for these three linear degrees of freedom and two angular degrees of freedom, the payload 54 can be effectively isolated from the base frame 55. However, and this is the key to the present invention, the payload is still mounted for stiff transmission of torque generated about the X axis to the base frame 55. Any flexibility of the angular degree of freedom about the X axis has been effectively minimized.

The payload in this instance comprises the payload frame 83 along with a mirror 85 and a stabilizing gyro 86. As shown, gyro 86 is mounted for rotation about the X axis, and thus generates a torque about the X axis. Apparatus 50, is designed so that this X-axis torque can be transmitted to the base frame 55 while isolating the payload and base from each other along the other two angular degrees of freedom and along the three linear degrees of freedom.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

We claim:

1. Apparatus for mounting a payload on a base, said apparatus being oriented with respect to arbitrary X, Y and Z axes with said axes being mutually perpendicular and meeting at a common center, and said payload containing a torque-producing device which spins about said X axis, wherein the torque generated about the X axis in the payload is communicated to the base through a stiff linkage in the rotational degree of freedom about the X axis comprising:

first and second support frames,
   means for mounting said payload on said first support frame,
   means for mounting said first support frame on said second support frame, and
   means for mounting said second support frame on said base, said mounting means including linear dampening means for dampening forces communicated linearly along the Y and Z axes between said payload and said base.

2. Apparatus as in claim 1 wherein said mounting means further includes linear dampening means for dampening forces communicated linearly along the X axis between said payload and said base.

3. Apparatus as in claim 1 or 2 wherein said mounting means further includes gimbal means for permitting rotation of the payload about the Y axis and about the Z axis.

4. Apparatus as in claim 3 wherein said gimbal means include rotation dampening means for dampening forces communicated rotationally about the Y and Z axes between said payload and said base.

5. Apparatus as in claim 4 wherein said dampening means comprise electric motors.

* * * * *